(12) United States Patent
Kraft et al.

(10) Patent No.: US 8,678,428 B2
(45) Date of Patent: Mar. 25, 2014

(54) AIRBAG FOR A VEHICLE OCCUPANT RESTRAINT SYSTEM IN A MOTOR VEHICLE AND A PROCEDURE FOR MANUFACTURING SUCH AN AIRBAG

(75) Inventors: Michael Kraft, Dornstadt (DE);
Manfred Schmid, Illertissen (DE);
Rainer Bausenhart, Senden (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/409,058

(22) Filed: Feb. 29, 2012

(65) Prior Publication Data
US 2012/0223511 A1    Sep. 6, 2012

(30) Foreign Application Priority Data
Mar. 3, 2011 (DE) .......................... 10 2011 005 057

(51) Int. Cl.
*B60R 21/213*  (2011.01)
*B60R 21/237*  (2006.01)

(52) U.S. Cl.
USPC ..................... 280/730.2; 280/728.2

(58) Field of Classification Search
USPC ............ 280/728.2, 730.2; 493/405, 413, 442, 493/454
IPC .................. B60R 21/213; B31B 1/26
See application file for complete search history.

(56) References Cited

U.S. PATENT DOCUMENTS

| | | | |
|---|---|---|---|
| 6,170,857 B1 | 1/2001 | Okada et al. | |
| 6,371,512 B1 | 4/2002 | Asano et al. | |
| 6,616,178 B1 * | 9/2003 | Nanbu | 280/730.2 |
| 6,644,687 B2 * | 11/2003 | Saito et al. | 280/730.2 |
| 6,712,386 B2 | 3/2004 | Fischer | |
| 7,059,630 B2 | 6/2006 | Maertens et al. | |
| 7,114,744 B2 * | 10/2006 | Sunabashiri | 280/730.2 |
| 7,163,232 B2 * | 1/2007 | Yokoyama et al. | 280/730.2 |
| 7,185,914 B2 * | 3/2007 | Recker et al. | 280/730.2 |
| 7,322,600 B2 * | 1/2008 | Inoue et al. | 280/730.2 |
| 7,404,790 B2 * | 7/2008 | Sugaya et al. | 493/458 |
| 7,469,922 B2 * | 12/2008 | Kino et al. | 280/729 |
| 7,673,897 B2 * | 3/2010 | Ochiai | 280/730.2 |
| 7,766,376 B2 * | 8/2010 | Yokoyama | 280/730.2 |
| 7,806,433 B2 * | 10/2010 | Mitsuo et al. | 280/730.2 |
| 7,828,322 B2 * | 11/2010 | Breuninger et al. | 280/730.2 |
| 8,006,999 B2 * | 8/2011 | Suemitsu et al. | 280/730.2 |
| 2004/0104561 A1 | 6/2004 | Maertens | |
| 2005/0275200 A1 | 12/2005 | Noguchi et al. | |
| 2006/0172874 A1 | 8/2006 | Sugaya et al. | |
| 2009/0184499 A1 | 7/2009 | Slaats et al. | |
| 2010/0164205 A1 * | 7/2010 | Yamamura et al. | 280/730.2 |

FOREIGN PATENT DOCUMENTS

| | | |
|---|---|---|
| DE | 198 51 545 A1 | 9/1999 |
| EP | 0 980 796 A2 | 2/2000 |

* cited by examiner

*Primary Examiner* — Paul N Dickson
*Assistant Examiner* — Laura Freedman
(74) *Attorney, Agent, or Firm* — Foley & Lardner LLP

(57) ABSTRACT

An airbag for a vehicle occupant restraint system for a motor vehicle is provided. The airbag comprising at least one first and at least one second fastening component to attach the airbag to a vehicle body. The second fastening component is attached in such a way that—in relation to the deflated, flat outspread state of the airbag—it is offset from the first fastening component in a perpendicular direction to the main extension direction of the airbag. A first section of the airbag that stretches to a side of the second fastening component facing away from the first fastening component, is folded by means of a first fold in the form of a rolled fold and a second section of the airbag that extends to a side of the second fastening component facing the first fastening component by means of a second fold different from a rolled fold.

13 Claims, 4 Drawing Sheets

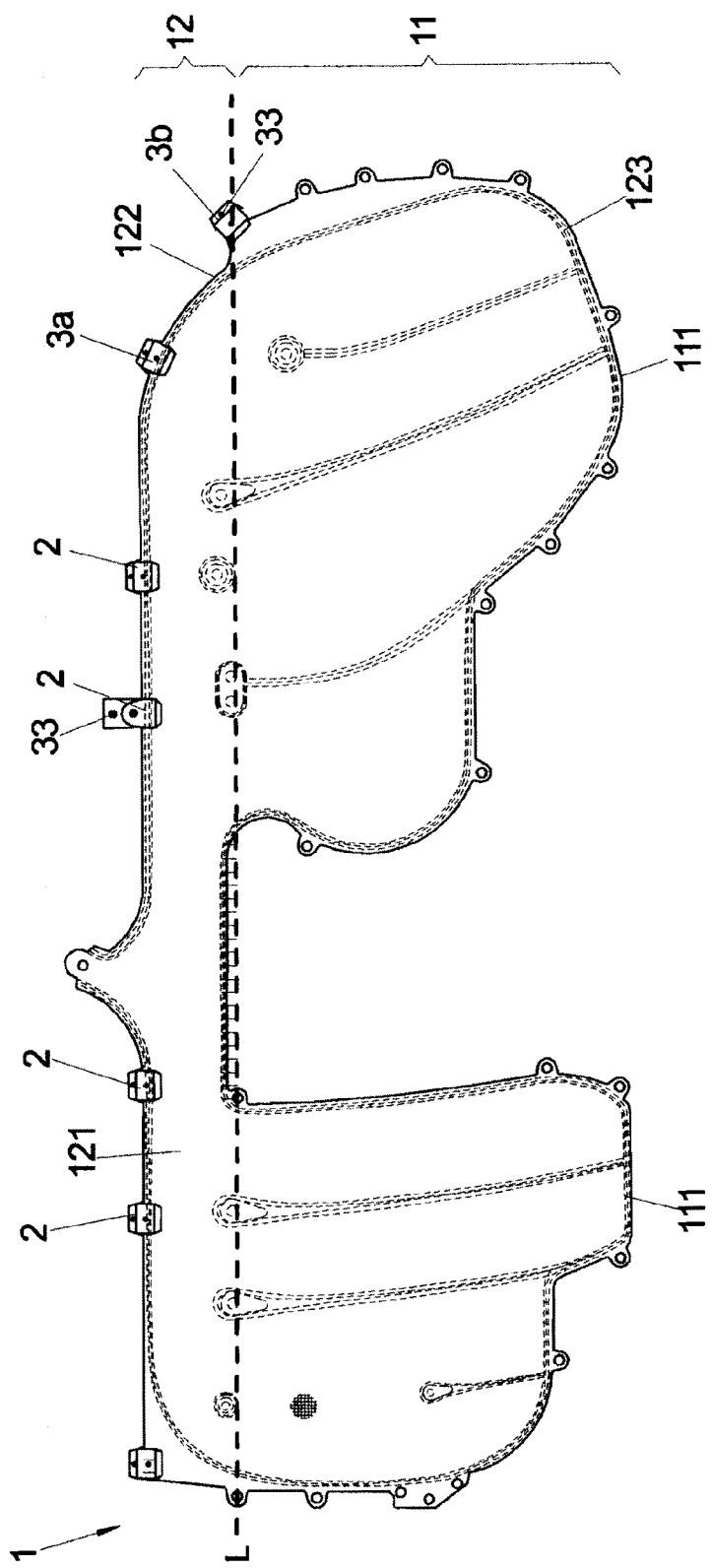

AIRBAG FOR A VEHICLE OCCUPANT RESTRAINT SYSTEM IN A MOTOR VEHICLE AND A PROCEDURE FOR MANUFACTURING SUCH AN AIRBAG

CROSS-REFERENCE TO RELATED APPLICATION

This application claims the benefit of the German Patent Application No. 10 2011 005 057.4, filed Mar. 3, 2011, the disclosure of which is fully incorporated herein by reference.

BACKGROUND

The invention relates to an airbag for a vehicle occupant restraint system in a motor vehicle and a procedure for manufacturing such an airbag.

Airbags for vehicle occupant restraint systems that extend along the side structure of a vehicle after inflation are known from state-of-the-art technology (curtain airbags). These airbags have, for example, fastening clips, by which they are connected to the vehicle body along a roof rail. Such an airbag is disclosed, for example, in U.S. Pat. No. 7,059,630.

SUMMARY

The problem to be solved by the present invention is to provide an airbag with as good a protective effect as possible over the longest period possible after it is deployed.

According to an exemplary embodiment of the invention an airbag for a vehicle occupant restraint system is provided with at least one first and at least one second fastening component to attach the airbag to a vehicle body, whereby the second fastening component is arranged in such a way that—in relation to the deflated, flat outstretched state of the airbag—it is offset from the first fastening component in a direction perpendicular to the main extension direction of the airbag, and whereby a first section of the airbag that stretches to a side of the second fastening component facing away from the first fastening component, is folded by means of a first fold in the form of a rolled fold and a second section of the airbag that extends to a side of the second fastening component facing the first fastening component by means of a second fold different from a rolled fold.

The second fastening component will accordingly—with regard to the state of the airbag installed in the vehicle—be offset from the first fastening component along the height axis of the vehicle. The main extension direction of the airbag is the direction in which the airbag has its greatest expansion in its flat outspread state (i.e. before being folded) or in its inflated state. In particular, the airbag is a side airbag (curtain airbag) that in its inflated state extends along the lengthwise axis of the vehicle with its main extension direction.

The fact that the first section of the airbag extends to "a side of the second fastening component facing away from the first fastening component" means that the first section of the airbag—in relation to the airbag installed in the vehicle and in its inflated state and in relation to the height axis of the vehicle—extends underneath the second fastening component, in particular between the second fastening component and a lower edge of the airbag (pointing towards the floor).

For example, compared with the first fastening component the second fastening component is further away from the roof pillar so that it can provide an additional, lower connection of the airbag to the vehicle body in order to make the inflated airbag as stable as possible.

It is also conceivable that the second fastening component is not only offset perpendicular to the main extension direction of the airbag (or the height axis of the vehicle) but also offset from the first fastening component along the main extension direction of the airbag (or along the lengthwise axis of the vehicle) in such a way that it extends in front of the first fastening component (i.e. at a shorter distance from the front of the vehicle) in order to attach the airbag also to a front area of the vehicle body, e.g. to the vehicle A column. For this the airbag has, for example, a section that extends at least partly over the A column whereby the second fastening component is attached in particular to this section of the airbag.

The folded airbag can also be enclosed in an airbag cover whereby the fastening components in particular protrude from the airbag cover.

The rolled fold with which the first (lower) section of the airbag is folded is, for example, designed in such a way that the second fastening component is not rolled up together with it so that the connection of the airbag via the second fastening component is affected as little as possible. The rolled fold can be designed around an axis that runs essentially perpendicular to the main unfolding direction (i.e. parallel to the main extension direction) of the airbag. The main unfolding direction is the direction in which the airbag normally unfolds when inflated. With a curtain airbag the main unfolding direction of the airbag is essentially along the height axis of the vehicle. The rolled fold can, however, also be designed in another way, particularly around an axis that extends at an angle to the main extension direction (or the main unfolding direction) of the airbag.

In particular the first section of the airbag folded by the rolled fold extends up to a (virtual) line that runs through the second fastening component or abuts it. For example, this line coincides with a fold line of the second fold through which the second section of the airbag is folded and/or with an axis around which the rolled fold of the first section is made, whereby a continuation of the fold line runs through the second fastening component. It is, however, also conceivable, that the fold line of the second fold extends a little underneath the first fastening component, i.e. to a side of the second fastening component facing away from the first fastening component.

According to another exemplary embodiment of the invention the second section of the airbag has an edge section that, in the flat outspread deflated state of the airbag, runs crookedly or which extends at an angle to an edge section of the airbag to which the first fastening component is attached. It must be pointed out that an "edge section" of the airbag or of a section of the airbag is formed in particular by the corresponding edge section of a material layer (airbag section) of the airbag. For example, the airbag is made up of at least two airbag layers that are joined to each other along a circumferential seam, whereby the circumferential seam confines an inflatable volume of the airbag. The two airbag layers are specially made and attached to each other in such a way that their respective edges align with each other at least in sections, whereby the edges of the airbag layers aligning with each other form an edge or an edge section of the airbag.

In particular, the first fastening component is attached to an edge section of the airbag that stretches essentially in a straight line, whereby the second fastening component, for example, is attached to an edge section of the airbag that extends crookedly or at an angle away from this straight edge section. The crooked or angled edge section of the airbag confines in particular an inflatable section of the airbag that will extend beyond the A column of the vehicle.

According to another exemplary version of the invention, the airbag has several second fastening components that are offset against the first fastening component, each in a direction perpendicular to the main extension direction of the airbag whereby the first section of the airbag folded by the rolled fold extends in particular up to that second fastening component that is offset the most from the first fastening component (i.e. up to the second fastening component that is attached in the lowest spot). The airbag is then folded in using the second fold, i.e. not with the rolled fold above this second fastening component, i.e. on a side of this second fastening component facing the first fastening component.

It is also possible that several first fastening components are provided that are arranged particularly in a line so that they essentially are not significantly offset from each other perpendicular to the main extension direction of the airbag (i.e. the height axis of the vehicle). These first fastening components in particular are attached to an edge section of the airbag extending in a straight line in the vehicle and along the vehicle's lengthwise axis. The second fastening component or the several second fastening components are then offset accordingly from this edge section of the airbag.

It must be pointed out that the formulation according by which the first and second fastening sections are "attached" to an edge section of the airbag covers both the case that the fastening components are made as an integral part of the airbag and also the case that the fastening components are separate components that are attached to the airbag by a fixing method (e.g. by being stitched or glued).

The first and the second fastening components are in particular each made in the form of a fastening clip that sticks out from an edge section of the airbag. For example, the fastening clips (at least some of the fastening clips) are essentially square whereby the sides of the fastening clips extending away from the airbag extend in particular perpendicular to the edge section of the airbag to which the fastening components are attached.

According to another exemplary embodiment of the invention, the fastening clip (the second fastening component) is longer in a vertical direction to the run of the edge section to which the second fastening clip is attached, than the first fastening clip (the first fastening component). With an oblong embodiment of the fastening clips the second fastening clip is therefore longer in the direction of its main extension direction than the first fastening clip. The length of the fastening clips may also be determined between an external edge section of the fastening clips (i.e. the edge section of the fastening clip that is furthest from the airbag) and the circumferential seam (along the main extension direction or perpendicular to the circumferential seam).

The fastening clips also each have in particular an opening to feed through a means of attaching (e.g. a bolt or a fixing clip). According to an embodiment of the invention, a circumferential seam or a section of a circumferential seam extends along the edge sections to which the fastening clips are attached. This circumferential seam confines an inflatable chamber of the airbag, whereby for the second fastening clip the lowest possible distance between the opening and the circumferential seam is greater than for the first fastening clip. The least possible distance between the opening and the circumferential seam is determined in particular along a perpendicular from the opening of the fastening clip to the circumferential seam in the area of the fastening clip.

In particular, it is also possible that the second fastening clip is aligned at an angle to the direction of the second fold, i.e.—in relation to the way in which the airbag is installed in the vehicle—at an angle to the vehicle height axis (or at an angle and not perpendicular to the main extension direction of the airbag). The fold direction is specified by the direction along which the fold moves, whereby the direction of the fold movement runs, in particular, perpendicular to the fold lines of the fold. For example, the fastening clip is aligned at an angle of about 20° to about 70° to a direction perpendicular to the main extension direction (i.e. to the fold direction) of the airbag.

The second fold is made in particular by a zigzag fold and/or a reversion of the second section of the airbag.

In addition, according to a further exemplary embodiment of the invention a procedure for manufacturing an airbag in accordance with the embodiments described above with the following steps is provided:

Preparing an airbag with at least one first and at least one second fastening clip to attach the airbag to a vehicle body whereby the second fastening component is attached in such a way that, in relation to the deflated, flat outspread condition of the airbag, is offset from the first fastening component in a direction perpendicular to the main extension direction of the airbag.

Folding a first section of the airbag that extends to a side of the second fastening component that is facing away from the first fastening component using a first fold in the form of a rolled fold; and folding a second section of the airbag that extends to a side of the second fastening component facing towards the first fastening component using a second fold different from a rolled fold.

In particular, the first airbag section stretches between the second fastening component and a bottom edge section of the airbag whereby the airbag is rolled in from the bottom edge section until the second fastening component reaches it but is not rolled in with it.

BRIEF DESCRIPTION OF THE DRAWINGS

The invention is described in more detail by means of embodiment with reference to the figures.

FIG. 1 shows an airbag in accordance with one embodiment of the invention.

DETAILED DESCRIPTION

Figure 1B:
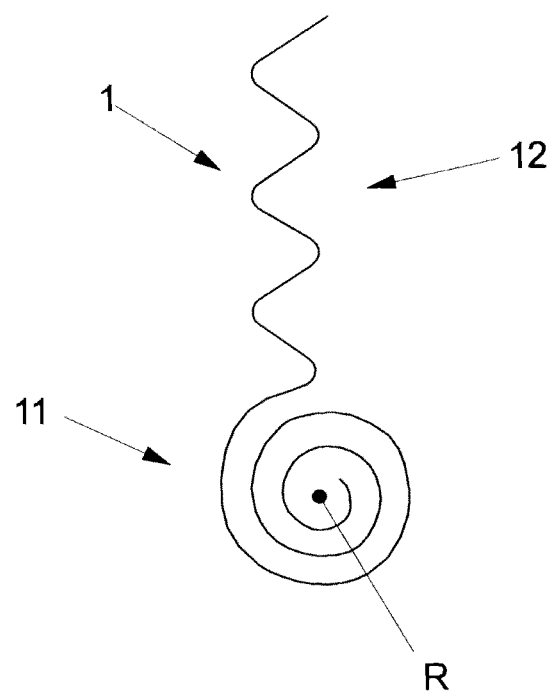
FIG. 1B is a side view of the airbag of FIG. 1 showing the folded sections of the airbag.

FIG. 1 shows an airbag 1 in accordance with the invention in a deflated, flat outspread condition from the top whereby the inflated airbag fitted in the vehicle has an identical or similar shape.

The airbag 1 has a majority of first fastening components in the form of fastening clips 2 and two second fastening components in the form of two second fastening clips 3a, 3b.

The airbag 1 is folded up before being fitted in the vehicle by a combination of a first fold in the form of a rolled fold and a second fold in the form of a fold different from a rolled fold. Here, a bottom, first section 11 of the airbag 1 that extends to a side of the second fastening clips 3a, 3b facing away from the first fastening clips 2, is folded using a rolled fold and a second section 12 that extends to a side of the second fastening clips 3a, 3b facing towards the first fastening clips using a zigzag fold or a similar fold. The first section is rolled into a fold so that even the bottom fastening clip 3b is not rolled up.

The second section 12 not folded with a rolled fold extends in particular from the bottom second fastening clip to a top edge section 121 of the airbag.

The first section 11 of the airbag stretches in particular from an underside 111 of the airbag, i.e. an edge section of the airbag that, in relation to the condition of the airbag fitted into the vehicle, faces away from the vehicle roof when it is inflated, up to no more than a line L that is aligned parallel to the top edge section 121 of the airbag to which the first fastening clips 2 are attached. The top edge section 121 runs essentially in a straight line and in the airbag fitted into the vehicle essentially parallel to a roof rail of the vehicle. The fold of the first and second sections 11, 12 of the airbag is made in particular in a direction perpendicular to the line L, i.e. the axis of the rolled fold and the fold lines of the second fold run at least approximately parallel to the line L.

Line L runs between the first section 11 and the second section 12 of the airbag through the lower of the two second fastening clips, i.e. through those of the second fastening clips that are the furthest away from the first fastening clips 2. The two second fastening clips 3a, 3b are offset from the first fastening clips 2 perpendicular to the main extension direction of the airbag 1, i.e. perpendicular to the top edge section 121.

The line L running between sections 11 and 12 does not necessarily run parallel to the main extension direction of the airbag but may also be aligned at an angle to this direction so that the axis of the rolled fold is also aligned at an angle to the main extension direction of the airbag, i.e. at an angle to the top edge section 121. In this case, the whole area of the airbag is not rolled under the lower fastening clip 3 b. However, one area (that extends in the main extension area of the airbag opposite the fastening clip 3 b) may also be rolled up above the fastening clip 3 b. The formulation that "the first section" is rolled up in a rolled fold thus does not necessarily mean that the whole section of the airbag that extends under the fastening clip 3 b is rolled up.

The first fastening clips 2 stretch behind each other along the straight line of the top edge section 121 of the airbag whereas the two second fastening clips 3a, 3b are attached to an edge section 122 of the airbag that runs away from the top edge section 121 in a crooked line. Thus the two fastening clips 3a, 3b are not only offset perpendicular to the main extension direction of the airbag, i.e.—in relation to the condition of the airbag installed in the vehicle—in the vehicle height axis direction but also along the main extension direction of the airbag, i.e. the longitudinal axis of the vehicle. The two second fastening clips 3a, 3b are used in particular to attach the airbag 1 to an A column of the vehicle.

The airbag 1 is formed by at least two airbag layers that are attached to each other along a circumferential seam 123. In addition, the airbag has additional seams that confine several inflatable chambers.

FIG. 1B shows the airbag 1 in FIG. 1. There is shown examples of folds, such as a rolled fold along a axis R along the first section 11 and a zigzag fold along the second section 12 of the airbag 1.

Figure 2A:
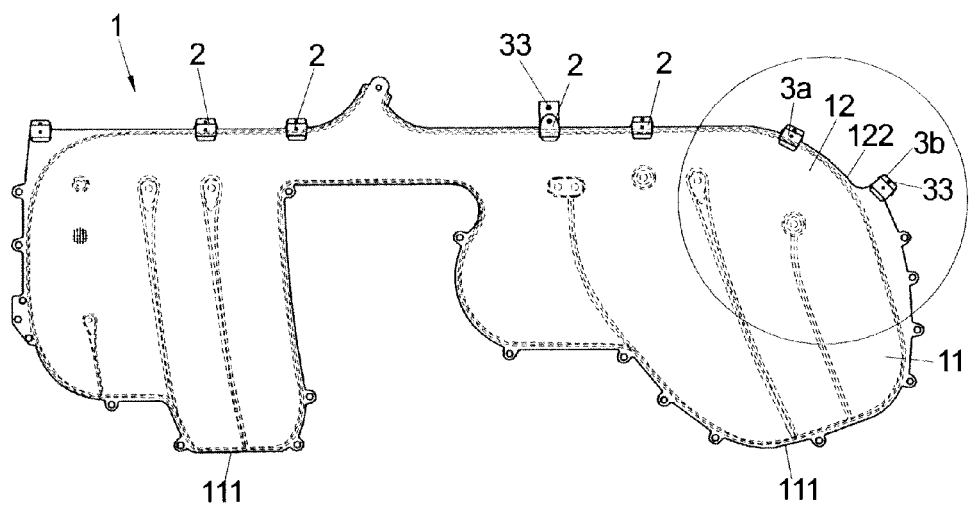
FIGS. 2A-2D show the airbag from FIG. 1 with a detailed view of the fastening clips.
Figure 2B:
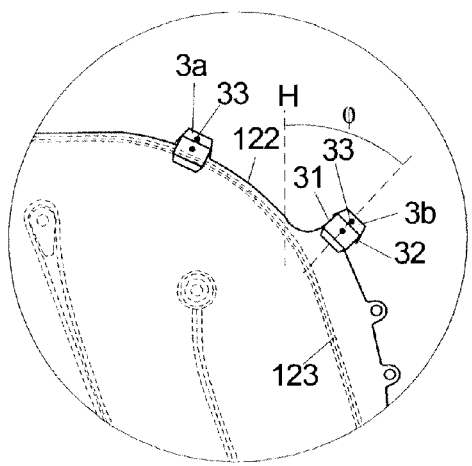
Figure 2C:
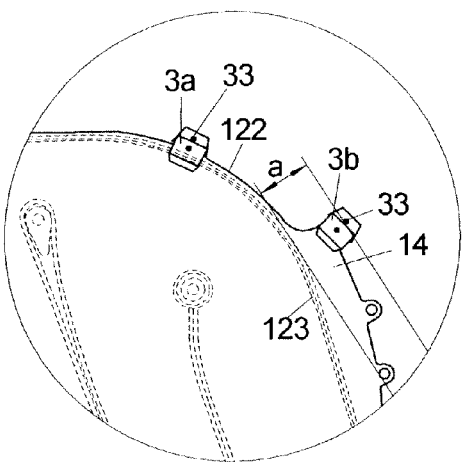

FIG. 2A also shows the airbag 1 in FIG. 1, whereby the area of the second fastening clips 3a, 3b is shown enlarged (FIGS. 2B and 2C).

As shown in FIG. 2B, the bottom fastening clip 3b (i.e. the one of the two second fastening clips that is furthest away from the top, first fastening clips 2) is aligned at an angle $\phi$ to a direction perpendicular to the main extension direction of the airbag, i.e. to the main unfolding direction H of the airbag.

The bottom second fastening clip 3b is also formed essentially as a square (like the second fastening clip 3a and the first fastening clips 2 attached further up) whereby the angle $\phi$ between the main unfolding direction H and the fastening clip is determined by the main unfolding direction H and the direction along which the fastening clip extends away from the airbag. In particular the bottom second fastening clip 3b has two side edges opposite each other 31, 32 that extend away from the airbag 1. The direction of these side edges 31, 32, extending away from the airbag can be used to determine the direction of the fastening clip so that the angle $\phi$ between the alignment of the edges 31, 32 and the main unfolding direction H can be specified. The main unfolding direction H runs in particular perpendicular to the top airbag section 121 or, when the airbag is installed in the vehicle, parallel to the vehicle height axis.

The second fastening clips 3a, 3b (like the first fastening clips 2) each have a fastening opening 33 through which a means of attaching, e.g. in the form of a fixing clip (not shown) can be fed through in order to attach the airbag 1 to a vehicle body. Apart from the (top) fastening opening the fastening clips also each have another (bottom) opening that can be used, for example, to attach a support. The bottom openings are, however, only optional.

Figure 2D:
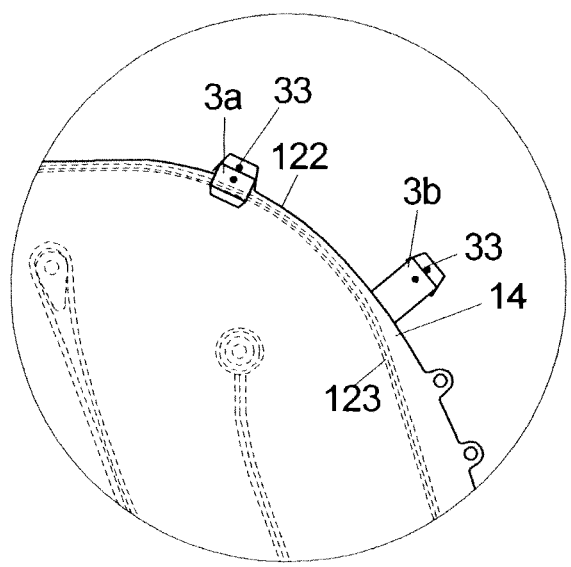

FIG. 2C shows that the bottom second fastening clip 3 b is longer—measured in a direction perpendicular to the curved edge section 122 of the airbag from which it stretches away—than the first fastening clips 2 that stick out from the top, straight edge section 121. FIG. 2D shows that the second fastening clip 3b may optionally be longer than the first fastening clips 2.

In particular, there is a gap a between the fastening opening 33 of the bottom second fastening clip 3b and a section of the circumferential seam 123 in the area of this fastening clip, i.e. a section of the circumferential seam that extends between the sides 31, 32 of the fastening clip 33 extended in the direction of the airbag, which is larger than the corresponding gap for the first fastening clips 2.

In other words, the fastening opening 33 on the bottom second fastening clip 3b is further away from the inflatable volume of the airbag confined by the circumferential seam than the fastening openings on the first fastening clips 2, which ensures that even after the airbag has been folded the bottom second fastening clip can be positioned in the correct position on the vehicle body. For this, the bottom fastening clip 3b is attached to a bulge 14 on the airbag that extends away from the circumferential seam 123 and is connected to the bottom second fastening clip 3b.

Of course, the airbag can have more than two second fastening components (i.e. fastening components offset downwards). Just like the embodiment in FIG. 1 the rolled fold is then extended up to the second fastening component furthest away from the upper edge of the airbag.

The invention claimed is:

1. An airbag for a vehicle occupant restraint system for a motor vehicle comprising:
   at least one first fastening component and two second fastening components to attach the airbag to a vehicle body,
   wherein the two second fastening components, in relation to a deflated flat, outspread state of the airbag, protrude from a curved edge section of the airbag obliquely relative to a main extension direction of the airbag,
   wherein the two second fastening components are offset from the first fastening component in a perpendicular direction to the main extension direction of the airbag,
   wherein each of the second fastening components includes a fastening opening,
   wherein one of the two second fastening components is offset at a greater distance from the first fastening component and has a larger gap from the fastening opening of the one of the two second fastening components to an inflatable volume of the airbag which is confined by a circumferential seam than a gap from the fastening opening of the other of the two fastening components to the inflatable volume of the airbag which is confined by the circumferential seam, wherein a first section of the airbag is folded by means of a first fold in the form of a rolled fold and a second section of the airbag is folded by means of a second fold different from a rolled fold; and wherein the first section of the airbag is located below a line that extends through the one of the two second fastening components that is offset at a greater distance from the first fastening component, wherein the line is substantially parallel to the main extension direction of the airbag, wherein the second section of the airbag is located above the line.

2. The airbag according to claim 1, wherein the rolled fold is designed in such a way that the second fastening component is not rolled in.

3. The airbag according to claim 1, wherein the rolled fold is designed around an axis that, in relation to a flat outspread state of the airbag, essentially runs parallel to the main extension direction of the airbag.

4. The airbag according to claim 1, wherein the rolled fold is designed around an axis that, in relation to the flat, outspread state of the airbag, runs at an angle to the main extension direction of the airbag.

5. The airbag according to claim 1, wherein the first fastening component is attached to an edge section of the airbag that runs essentially in a straight line when the airbag is not inflated and is spread out flat.

6. The airbag according to claim 1, wherein several first fastening components that are arranged in a line, so that the first fastening components, in relation to the flat, outspread condition of the airbag, are essentially not offset against each other perpendicular to the main extension direction of the airbag.

7. The airbag according to claim 1, wherein the first and second fastening components are each designed in the form of a fastening clip that juts out from an edge section of the airbag.

8. The airbag according to claim 7, wherein the one of the second fastening clips that is offset at a greater distance from the first fastening clip is longer, in relation to the flat, outspread condition of the airbag and perpendicular to a run of the edge section to which the one of the second fastening clips that is offset at a greater distance from the first fastening clip is attached, than the first fastening clip.

9. The airbag according to claim 7, wherein each of the first and second fastening clips has an opening to feed through a means of fastening and that a circumferential seam confining an inflatable chamber of the airbag extends along the edge sections of the airbag to which the fastening clips are attached, wherein, in relation to the flat, outspread state of the airbag, for the one of the second fastening clips that is offset at a greater distance from the first fastening clip the lowest possible distance between the opening and the circumferential seam is greater than for the first fastening clip.

10. The airbag according to claim 7, wherein the one of the second fastening clips that is offset at a greater distance from the first fastening clip, in relation to the flat, outspread state of the airbag, is aligned at an angle to a direction perpendicular to the main extension direction of the airbag.

11. The airbag according to claim 1, wherein the second fold is made by a zigzag fold or encasing the second section of the airbag.

12. A procedure for manufacturing an airbag in accordance with claim 1 with the following steps:

preparing an airbag with at least one first fastening component and two second fastening components to attach the airbag to a vehicle body whereby the second fastening component is attached in such a way that, in relation to the deflated, flat spread out condition of the airbag, is offset from the first fastening component in a direction perpendicular to the main extension direction of the airbag;

folding a first section of the airbag that extends to a side of the one of the second fastening components that is offset at a greater distance from the first fastening component that is facing away from the first fastening component using a first fold in the form of a rolled fold; and folding a second section of the airbag that extends to a side of the one of the second fastening components that is offset at a greater distance from the first fastening component facing towards the first fastening component using a second fold different from a rolled fold.

13. The airbag according to claim 1, wherein the first section of the airbag which is rolled up in a rolled fold stretches up to no more than a line that runs parallel to the main extension direction of the airbag and through the second fastening component.

* * * * *